United States Patent [19]

Juskevic

[11] Patent Number: 4,521,142
[45] Date of Patent: Jun. 4, 1985

[54] KEY CUTTING MACHINE

[75] Inventor: John Juskevic, Dearborn, Mich.

[73] Assignee: Essential Automotive Products, Inc., Dearborn Heights, Mich.

[21] Appl. No.: 412,549

[22] Filed: Aug. 30, 1982

[51] Int. Cl.$^3$ .............................................. B23C 1/16
[52] U.S. Cl. ....................................... 409/82; 76/110; 409/81
[58] Field of Search ..................... 409/81, 82, 83, 84; 76/110

[56] References Cited

U.S. PATENT DOCUMENTS

| | | | |
|---|---|---|---|
| 1,889,461 | 11/1932 | Hansen | 409/82 X |
| 3,807,276 | 4/1974 | Oliver | 76/110 X |
| 3,902,382 | 9/1975 | Lieptz | 409/81 X |
| 4,051,748 | 10/1977 | Sherman | 409/81 X |
| 4,092,806 | 6/1978 | Wich | 409/81 X |
| 4,140,043 | 2/1979 | Hückinghaus et al. | 409/81 |
| 4,256,423 | 3/1981 | Juskevic | 409/81 X |

*Primary Examiner*—William R. Briggs
*Assistant Examiner*—Glenn L. Webb

*Attorney, Agent, or Firm*—Cullen, Sloman, Cantor, Grauer, Scott and Rutherford

[57] ABSTRACT

A machine for cutting a contoured edge into a key blank according to a predetermined guide surface. The key blank is mounted in a vise located at one end of a fixture which has means for establishing the guide surface at a second end. The fixture is journaled on a stationary shaft for pivoting about and horizontally sliding along the shaft. A cutting wheel is journaled for rotation on an arbor and is arranged to be engaged by the key blank as the fixture is moved. A stationary stylus is arranged to contact the guide surface to control the pivoting movement of the fixture. A spring urges the fixture to pivot in one direction to cause the stylus to contact the guide surface and the cutting wheel to cut into the key blank in accordance with the guide surface as the fixture slides horizontally along the shaft. The guide surface comprises a series of rotatable disks aligned on a shaft which have successive steps of different depths formed on a portion of the periphery of each disk. A cam is provided to selectively prevent the spring from pivoting the guide means and key blank toward the stylus and cutting wheel if it is desireable to interrupt the cutting operation.

1 Claim, 8 Drawing Figures

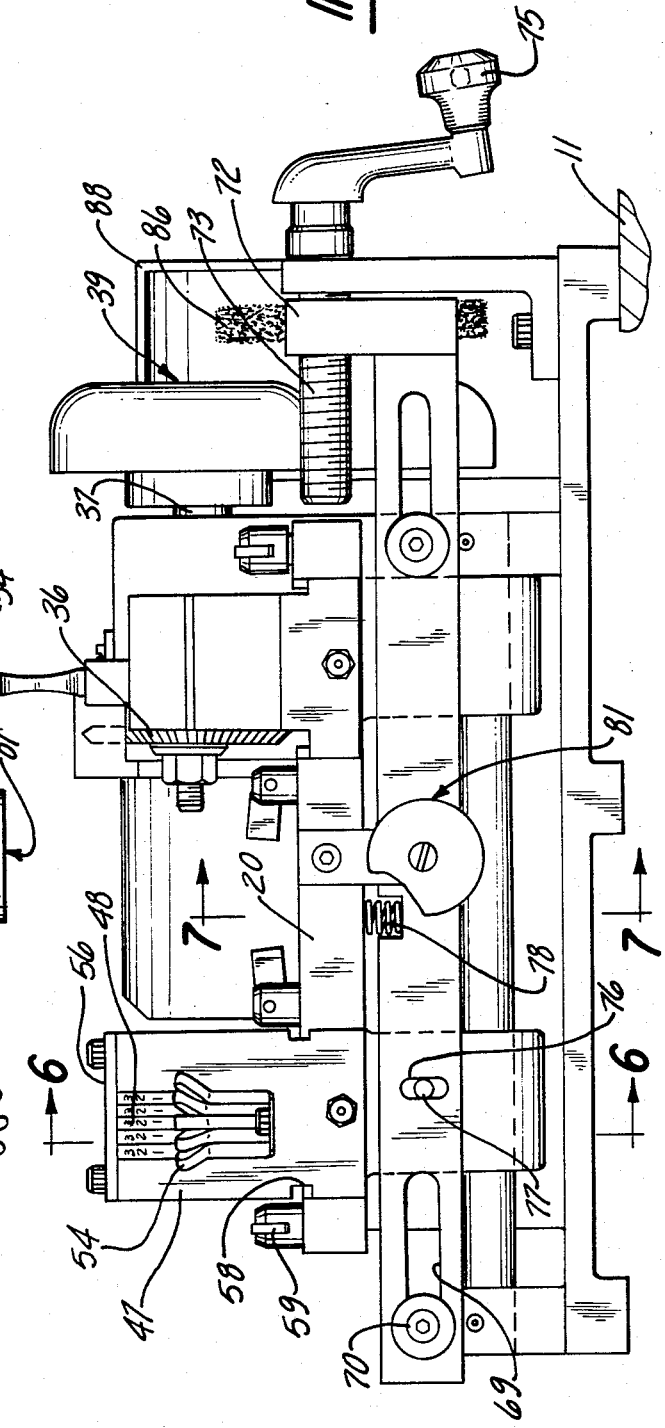
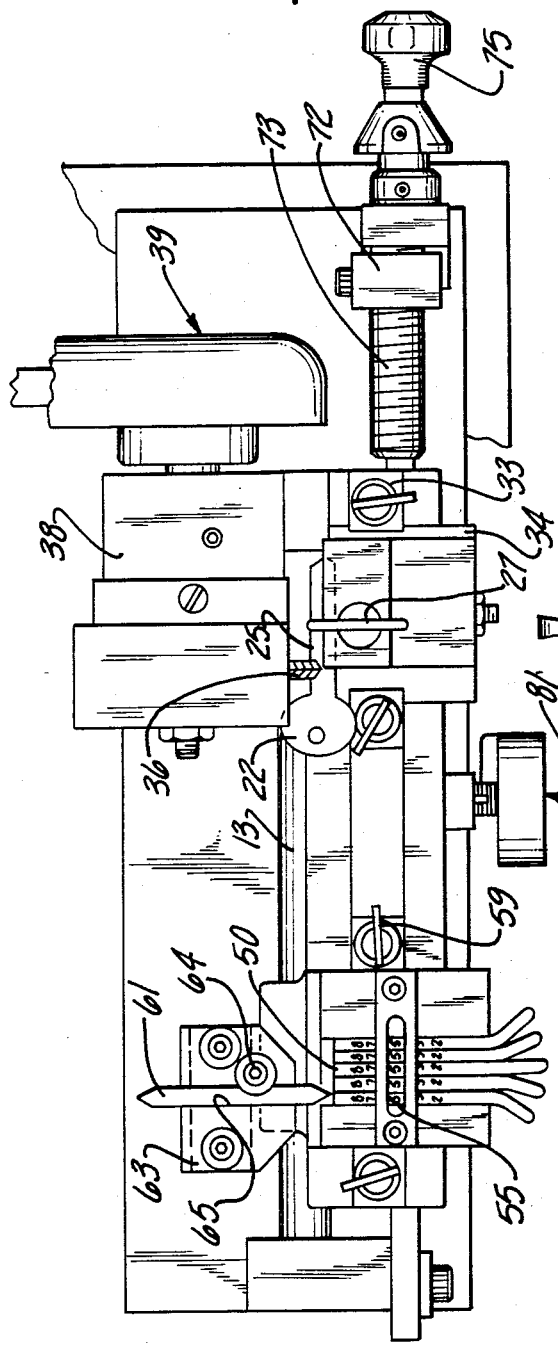

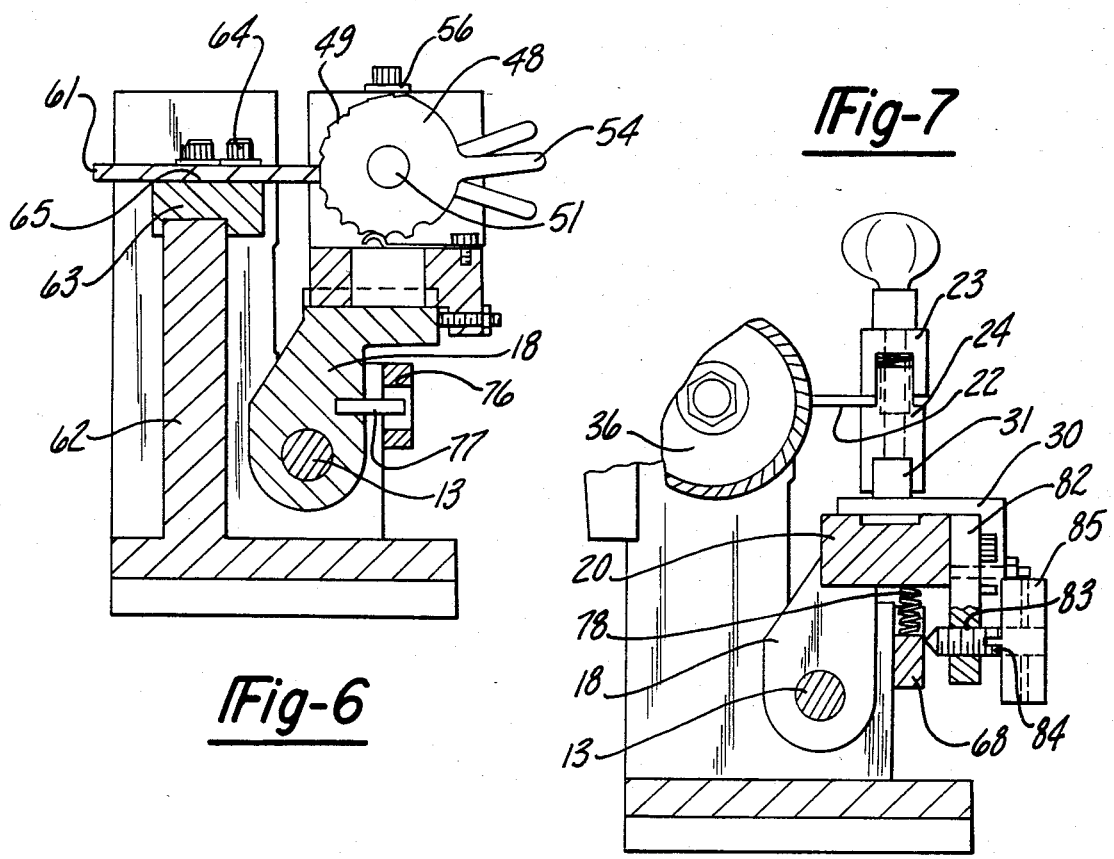
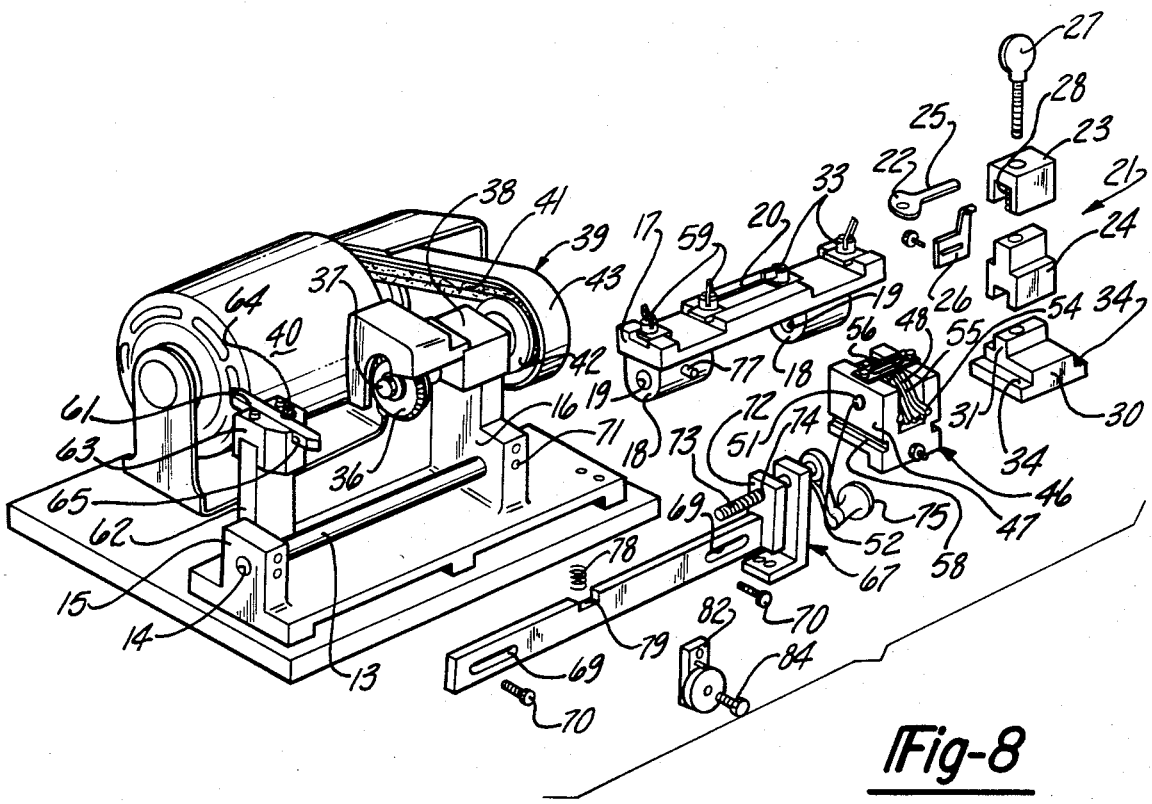

KEY CUTTING MACHINE

BACKGROUND OF THE INVENTION

1. Technical Field

The present invention relates to a machine for cutting a contoured edge on a key. More specifically, the machine cuts a contoured edge on a key blank in accordance with a guide surface mounted on a common fixture for movement with the key blank.

2. Prior Art

Machines for cutting a contoured surface on a key blank with a rotating cutting wheel controlled by the movement of a stylus engaging a guide means are conventional. Various guide means have been used on key duplicating machines and have included the use of a master key, a cam plate having a plurality of cam surfaces, a drum having a plurality of holes of different depths, and plates having groove patterns formed on one surface. In each prior art system the guide means is adapted to be traced by a stylus according to a predetermined pattern.

Applicant's prior U.S. Pat. No. 4,256,423 issued Mar. 17, 1981 discloses a key cutting machine having a guide means with a guide surface formed by a series of disks which are axially aligned on a shaft. The disks are provided with a series of radially disposed steps of different radii that can be aligned by rotating the disks into various step combinations for contact by the stylus. The guide means is adapted to be mounted on one leg of an L-shaped lever for engagement with the stylus. The other leg of the lever is provided with a vise for holding a key blank in engagement with a rotating cutting wheel. While Applicant's prior machine enjoyed advantages over prior art key cutting machines that resulted from the improved guide means, the prior design presented certain problems in set up and operation of the machine.

The present invention is a key cutting machine for reproducing or duplicating keys either from existing key originals or from a guide surface that enjoys all of the advantages of applicants prior machine and also features a simplified arrangement of parts that makes the machine both simple to set up and easy to operate. The present invention permits continuous visual monitoring of the edge cutting operation. The machine utilizes a pivotable fixture having a key blank vise at one end opposite the rotating cutting wheel and a guide means at the opposite end adapted to be engaged by a stylus. The key blank vise and guide means are readily accessible for set up and simultaneously visible to an operator to permit constant control of the cutting operation.

SUMMARY OF THE INVENTION

The invention relates to a key duplicating machine which comprises a horizontal fixed shaft upon which a fixture is journaled for pivoting movement around the shaft and for sliding movement along the shaft. A vise is mounted on one end of the fixture which holds a key blank with an edge parallel to the axis of rotation of a cutting wheel for cutting the key blank. Guide means and a stylus are arranged on the fixture and on the base for controlling the pivoting movement of the fixture. Drive means causes the fixture to slide horizontally along the fixed shaft while a biasing means urges the fixture toward the rotating cutting wheel. A contoured edge is cut in the key blank as the fixture is moved horizontally by the drive means and is pivoted toward and away from the rotating cutting wheel as controlled by the stylus following the guide means.

The machine is simple in construction and can be quickly set up for operation. The guide means and key blank vise are readily accessible and visable during the entire cutting operation. In the disclosed embodiment the guide means and key blank are aligned with each other near the top of the machine to facilitate set up and operation.

One object of the present invention is to provide a key duplicating machine having a stylus which is fixed relative to the rotating cutting wheel for regulating the movement of a key blank toward and away from the cutting wheel as the guide means is indexed horizontally relative to the stylus. The guide means and key blank vise are both located on the fixture to be easily accessible to the operator.

Another object of the present invention is to provide a key cutting machine which may be continually visually monitored by an operator.

A further object of the present invention is to provide a key cutting machine in which the cutting operation may be interrupted by the operator.

These and other objects and advantages of this invention will become apparent upon reading the following description, of which the attached drawings form a part.

DESCRIPTION OF THE DRAWINGS

FIG. 4 is a front elevational view of the machine.

FIG. 5 is a plan view of the cutting and tracing portion of the machine.

FIG. 6 is an end view, in cross-section, taken in the direction of arrows 6—6 in FIG. 4.

FIG. 7 is an end view, in cross-section, taken in the direction of arrows 7—7 in FIG. 4.

FIG. 8 is a perspective view of the machine shown in partially disassembled relationship.

DETAILED DESCRIPTION

Figure 1:
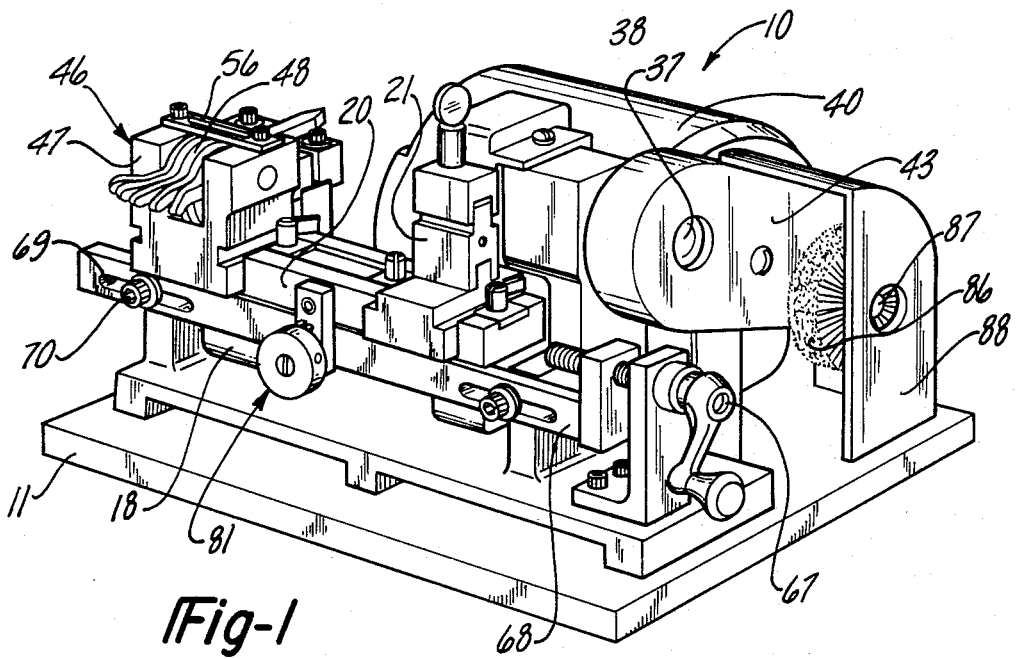
FIG. 1 is a perspective view of the key cutting machine.
Figure 3:
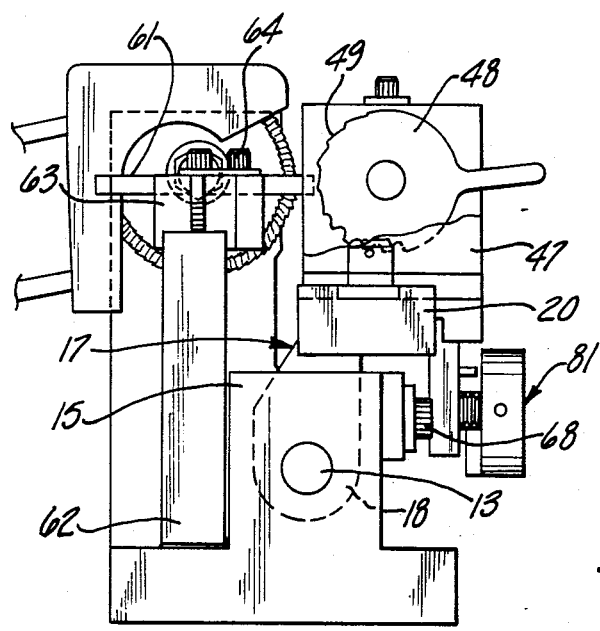
FIG. 3 is a partially cut-away end view of the machine from the stylus end of the machine.
Figure 2:
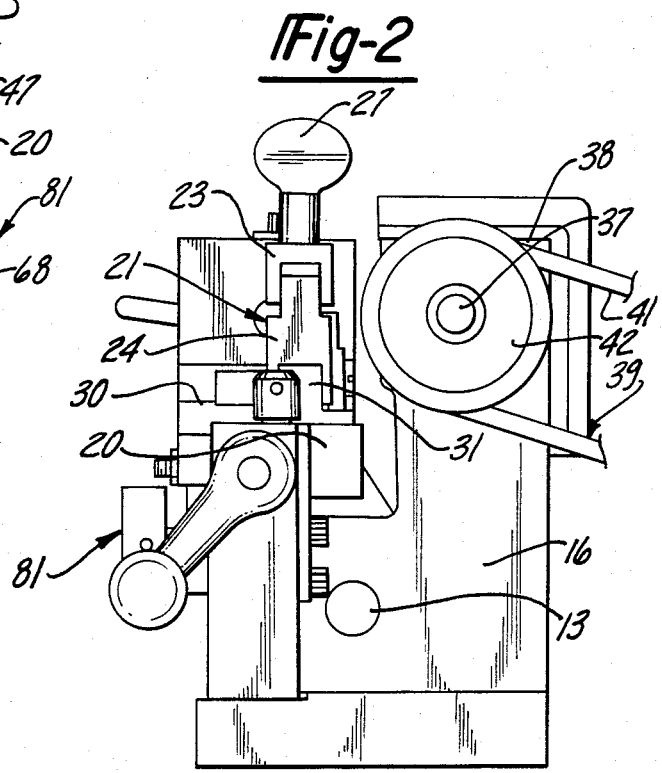
FIG. 2 is an elevational end view of the machine from the cutting wheel end.

As shown in the drawings, the key duplicating machine 10 includes a base 11 upon which a horizontal shaft 13 is mounted in a fixed position. The opposite ends of the shaft are secured within openings 14 formed in first and second support plates 15 and 16. First and second support plates 15 and 16 are upright members extending vertically from the base 11. An elongate fixture 17 comprising a pair of brackets 18 extending toward the shaft 13 form a platform portion 20. The fixture being moveably mounted on the shaft-13 which is received within openings 19 formed in the brackets 18. The fixture 17 is pivotable about the shaft 13 and is longitudinally moveable in the direction of the axis of the shaft 13.

A vise 21 is mounted at one end of the fixture 17 to hold a key blank 22 between an upper jaw 23 and a lower jaw 24. The key blank 22 is held in a horizontal position as fixed by an end stop 26 with an edge 25 extending from between the upper jaw 23 and lower jaw 24. The upper and lower jaws 23 and 24 are clamped together by a thumb screw 27. A spring 28 is preferably placed between the upper and lower jaws 23 and 24 on the thumb screw 27 to hold the respective jaws apart allowing the key blank 22 to be inserted between the jaws when the thumb screw 27 is loosened. The vise 21 is mounted on the fixture 17 by means of a mounting block 30 that extends transversely across the fixture and includes an upstanding vertical flange 31 to which the lower jaw 24 of the vise is secured. Clamps 33 are provided on the platform to engage horizontally extending flanges 34 on opposite sides of the block 30 to secure the block 30 to the fixture 17.

A conventional key cutting wheel 36 is mounted for rotation on an arbor 37 for engagement with the key blank 22. The arbor 37 is received within a journal block 38 which is integrally formed with second support plate 16. The arbor 37 includes a drive system 39 on the opposite side of the journal block 38 from the cutting wheel 36. The drive system 39 includes a motor 40 mounted on the base 11 which drives the arbor 37 by means of a belt 41 and pulleys 42. A guard 43 is preferably provided to shield the belt 41 and pulleys 42.

Guide means 46 are mounted on the fixture 17 in spaced relation to the vise 21. The guide means 46 include a U-shaped block 47 having a plurality of disks 48 with a plurality of steps 49 formed in a peripheral edge. The disks 48 cooperate to provide a guide surface 50 by aligning the steps 49 horizontally in various combinations. The steps 49 are combined according to a coded system corresponding to a desired key contour. These disks are mounted on a horizontal shaft 51 that is received within openings 52 in the U-shaped block 47. The disks are preferably provided with levers 54 which facilitate turning the disks 48 to various positions. Indicia 55 corresponding to coded cut depths are marked on a portion of the periphery of the disks 48 to indicate which step 49 of each disk 48 is aligned as part of the guide surface 50. A sight 56 may advantageously be provided on the top of the U-shaped block to aid in aligning the disks according to the indicia 55. Grooves 58 are formed in opposite sides of the U-shaped block 47 to allow the block to be retained on the fixture 17. Clamps 59 mounted on the fixture 17 engage a portion of the grooves 58 to lock the guide means 46 on the fixture 17.

Alternatively, guide means 46 may comprise a second vise constructed identical to vise 21 wherein an original key provides the guide surface 50. The second vise would be releasably mounted on the fixture 17 at a location spaced from and aligned with the vise 21. In one embodiment, the second vise is interchangeable with the U-shaped block having a plurality of disks for cutting keys according to a code as previously described.

A stylus 61 traces the guide surface 50 as the fixture 17 is moved horizontally. The stylus 61 is rigidly mounted on a third support bracket 62. The stylus 61 is retained within a head 63 which is attached to the top of the third support bracket 62. A clamping screw 64 engages the stylus 61 to secure it within a groove 65 which traverses the head 63 in the horizontal direction perpendicular to the axis of the shaft 13.

Drive means 67 is provided to move the fixture 17 horizontally along the shaft 13 to allow the stylus 61 to trace the guide surface 50 as the cutting wheel 36 cuts the key blank 22. Drive means 67 comprises a horizontal bar 68 which is an elongate member moveably mounted on and extending parallel to the horizontal shaft 13 between the first and second support plates 15 and 16. The bar 68 is provided with elongated slots 69 which are adapted to receive screws 70 that extend perpendicular to the shaft 13 from holes 71 formed in the first and second support plates 15 and 16. The slots 69 are larger than the diameter of the screws 70 to permit the bar 68 to slide relative to the screws. A flange 72 is provided on one end of the horizontal bar 68 for receiving a drive screw 73 in a threaded hole 74. The drive screw 73 is provided to drive the horizontal bar 68 parallel to the shaft 13 as the drive screw 73 is rotated. A handle 75 is provided on one end of the drive screw 73 to facilitate rotation of the drive screw 73. Alternatively, a power drive mechanism (not shown) such as a motor coupled through gears to shaft 13, may be provided to move the horizontal bar 68 reciprocally.

The horizontal bar 68 is interconnected with the fixture 17 for horizontal movement while permitting the fixture 17 to pivot about the shaft 13. A vertically elongated slot 76 is formed in the bar 68 to receive a pin 77 that is rigidly connected to one of the brackets 18 of the fixture 17. The pin 77 positively interconnects the bar 68 with the fixture 17 to cause the fixture to move horizontally with the bar 68. The elongated slot 76 is provided to permit the pin 77 to move upwardly and downwardly as the fixture 17 pivots about the shaft 13. Thus, the bar 68 moves the pin 77 and the fixture 17 in the direction parallel to the axis of the shaft 13, while permitting the fixture 17 to pivot about the shaft 13.

A helical spring 78 operatively engages the bar 68 and the fixture 17 to urge the fixture to rotate about the shaft 13 thereby forcing the guide means 46 into engagement with the stylus 61 and the key blank 22 into engagement with the cutting wheel 36. The helical spring biasing means 78 is received in a slot 79 formed in the top surface of the horizontal bar 68. The helical spring 78 engages the bottom surface of the fixture 17 on one end and the slot 79 on the opposite end.

Cam means 81 is provided to counter the force of the helical spring 78 in case it is necessary to move the stylus 61 and cutting wheel 36 out of engagement with the guide means 46 and key blank 22 respectively. Cam means 81 comprise an extension block 82 that is secured to the fixture 17 to extend downwardly from the fixture and adjacent to the bar 68. A threaded hole 83 is provided in one end of the extension block 82 to receive a threaded shaft 84. The threaded shaft member 84 may be driven through the threaded hole 83 to engage the bar 68 to positively move the fixture against the force of the helical spring 78 forcing the guide means 46 and key blank 22 out of engagement with the stylus 61 and cutting wheel 36 respectively to interrupt the cutting operation. The threaded shaft 84 may be advantageously provided with a thumb wheel 85 to facilitate operation of the cam means 81.

A wire brush 86 may be affixed to one end of the motor spindle for removing burrs from the finished key edge. The wire brush 86 is provided with a guard 88 as shown in FIG. 1.

In operation, a key blank 22 is first inserted within the vise 21. The vise 21 is opened by turning the thumb screw 27 which allows the spring 28 to separate the upper jaw 23 from the lower jaw 24. The key blank 22 is then placed on the lower jaw 24 so that its tip engages the end stop 26 which locates the key blank 22 in a precise position. The thumb screw 27 is then tightened to clamp the key blank 22 with one edge 25 extending from the vise toward the cutting wheel 36. The guide surface 50 is then established by either placing an original key in a similar vise on the fixture 17 in spaced relation to the vise 21 or by adjusting the disks 48 of a guide means 46 in accordance with a known key cutting code by aligning the steps 49 to form the guide surface 50. The disks 48 are rotated by moving the levers 54 until the indicia 55 on the periphery of the disks 48 are aligned in the sight 56 in accordance with the key cutting code.

After the guide surface 50 and key blank have been set up the key cutting operation may commence. The key cutting operation is effected by rotating the handle 75 which drives the bar 68 to move the fixture 17. The fixture 17 is urged by the helical spring 78 to rotate about the shaft 13 so that the guide means 46 and key blank 22 are forced into engagement with the stylus 61 and cutting wheel 36 respectively. As the fixture 17 is moved horizontally the stylus 61 traces the guide surface 50 which controls the pivoting movement of the fixture 17 according to the depth of the steps 49. The key blank 22 is accordingly pivoted toward and away from the cutting wheel 36 changing the depth of cut in the key blank 22 to produce the desired contour on the edge 25 of the key blank 22.

The guide surface 50 and key blank 22 are both located near the top of the machine 10 to be readily accessible for set up of the machine 10 and are clearly visable at all times during the cutting operation. The operator can monitor the progress of the cutting operation continually as he turns the handle to assure that the contoured key edge is accurately cut in the key blank 22. If at any time during the cutting operation the operator must interrupt the cutting cycle the key blank 22 may be withdrawn from the cutting wheel 36 by simply turning the thumb wheel 85 of the cam means 81.

As a final step, after the cutting operation has been completed, the key may be deburred by cleaning the freshly cut edge on the wire brush 86.

The guide means 46 and vise 21 are preferably located equidistant from the shaft 13 to assure an exact reproduction of the key surface. The depth of the steps on the disks are equal to the desired depth of cut on the key edge so that an operator may simply visually compare the depth of cut on the blank 22 to the depth of the steps 49. While the code type guide means 46 could be made smaller if located closer to the shaft 13, changing from a code based guide means to an original key guide means would be complicated since the stylus 61 would have to be moved to a point the same distance from the shaft 13 as the key blank 22 to permit reproduction of the original key surface. According to the invention the U-shaped block 47 containing the disks 48 may be quickly interchanged with a vise for holding an original key without having to change the location of the stylus 61.

It should be noted that the stylus 61 may be formed with two tips on opposite ends having different angular measurements. By so doing, one stylus 61 may be used to cut keys with transitions between lands having one of two angular measurements.

Also, the number of steps 49 and width of the steps of the guide means may be different depending on the type of key being cut. Therefore, it may be desirable to provide several types of guide means 46 that are interchangeable and have different disks 48 for different types of keys.

Having fully described an operative embodiment of this invention I now claim:

1. A key duplicating machine for cutting a contoured edge on a key blank, comprising:

a base having a vertically arranged rigid support member;

a fixed shaft mounted upon the support member and extending horizontally above the base;

a fixture having a bracket extending from a platform portion toward the fixed shaft, with said bracket including an opening for journaling said fixed shaft, and said fixture being both pivotable and slideable upon the fixed shaft;

a key blank vise mounted upon a first end of the platform portion for temporarily clamping the key blank with an edge of the key blank being arranged parallel to said fixed shaft;

a rotating cutting wheel mounted upon the base for rotation about an axis parallel to the fixed shaft, said rotating cutting wheel being adapted to cut the edge of the key blank;

guide means mounted on a second end of the platform portion and a stylus mounted upon the base, and said guide means and stylus mounted for relative movement upon the platform portion and the base, with said guide means establishing a horizontal guide surface, and said stylus engaging the horizontal guide surface;

drive means for sliding said fixture relative to the fixed shaft, said drive means having means for interconnecting the fixture to the base to slide the fixture along the fixed shaft, with said means for interconnecting the fixture to the base permitting said fixture to pivot about said shaft, and wherein said drive means comprises an elongate bar mounted on the base for reciprocating horizontal movement and said means for interconnecting the fixture to the base comprises a vertically elongated slot in said elongate bar and a pin extending from the fixture into the vertically elongated slot, with said pin being moveable vertically in said vertically elongated slot, whereby said elongate bar positively engages said pin for horizontal reciprocating movement while said pin is moveable vertically to permit said fixture to pivot relative to the fixed shaft;

biasing means for urging said fixture pivotally relative to said fixed shaft causing the key blank and guide means to pivot toward the rotating cutting wheel and stylus respectively, and said biasing means comprising a spring which is mounted in a slot formed in an edge of said elongate bar with one end of said spring engaging a bottom surface of said fixture and with the other end of said spring engaging said slot, and adjustable cam means interengaging the elongated bar and the fixture for holding said fixture against the urging of the biasing means thereby separating the rotating cutting wheel from the key blank, and wherein the stylus engages the guide means and the rotating cutting wheel engages the key blank at spaced points at substantially equal radial distances from the fixed shaft, and said spaced points are substantially horizontally aligned on the platform portion in substantially the same radial direction relative to the fixed shaft;

whereby the drive means slides the fixture horizontally relative to the shaft and the rotating cutting wheel respectively, while the biasing means urges the guide means and stylus into engagement with the stylus tracing the horizontal guide surface, thereby controlling the pivoting movement of the key blank toward and away from the rotating cutting wheel as it cuts the contoured edge upon the key blank.

* * * * *